(12) United States Patent
Nilsson et al.

(10) Patent No.: US 11,711,553 B2
(45) Date of Patent: Jul. 25, 2023

(54) TRANSMISSION PARAMETER CONTROL FOR SEGMENT DELIVERY

(71) Applicant: BRITISH TELECOMMUNICATIONS PUBLIC LIMITED COMPANY, London (GB)

(72) Inventors: Michael Nilsson, London (GB); Yousif Humedia, London (GB); Stephen Appleby, London (GB)

(73) Assignee: British Telecommunications Public Limited Company, London (GB)

( * ) Notice: Subject to any disclaimer, the term of this patent is extended or adjusted under 35 U.S.C. 154(b) by 539 days.

(21) Appl. No.: 16/473,784

(22) PCT Filed: Dec. 13, 2017

(86) PCT No.: PCT/EP2017/082671
§ 371 (c)(1),
(2) Date: Jun. 26, 2019

(87) PCT Pub. No.: WO2018/121990
PCT Pub. Date: Jul. 5, 2018

(65) Prior Publication Data
US 2019/0342591 A1 Nov. 7, 2019

(30) Foreign Application Priority Data
Dec. 29, 2016 (EP) .................... 16207404

(51) Int. Cl.
H04L 12/28 (2006.01)
H04N 21/2343 (2011.01)
(Continued)

(52) U.S. Cl.
CPC ... *H04N 21/23439* (2013.01); *H04N 21/2407* (2013.01); *H04N 21/26216* (2013.01); *H04N 21/26233* (2013.01); *H04N 21/8456* (2013.01)

(58) Field of Classification Search
CPC .......... H04N 21/2402; H04N 21/2407; H04N 21/8456; H04N 21/23439;
(Continued)

(56) References Cited

U.S. PATENT DOCUMENTS 6,480,537 B1 * 11/2002 Agrawal .............. H04N 21/435
375/E7.277
6,570,926 B1 * 5/2003 Agrawal ............ H04N 21/4431
382/253
(Continued)

FOREIGN PATENT DOCUMENTS

CA 2885678 A1 * 4/2014 ............. G01N 15/06
CN 1937454 A 3/2007
(Continued)

OTHER PUBLICATIONS

International Search Report and Written Opinion for Application No. PCT/EP2017/082671, filed Dec. 13, 2017, dated Feb. 23, 2018 (10 pgs).

(Continued)

Primary Examiner — Khanh Q Dinh
(74) Attorney, Agent, or Firm — Patterson Thuente, P.A.

(57) ABSTRACT

A method of delivering a video sequence in a network, the sequence including a plurality of temporal segments encoded at a plurality of qualities, the method including storing a dataset indicating the relative size of segments of the video stream; computing in dependence on that dataset a time schedule for delivery of the segments, the time schedule indicating a target delivery time for each segment sufficient to deliver all the segments in the sequence in time for decoding and being independent of the encoded quality of each segment; for each segment: setting one or more transmission parameters for the segment in dependence on the target delivery time for the segment and the relative size (Continued)

of the segment; and delivering the segment over the network using the one or more transmission parameters.

15 Claims, 10 Drawing Sheets

(51) Int. Cl.
*H04N 21/24* (2011.01)
*H04N 21/262* (2011.01)
*H04N 21/845* (2011.01)

(58) Field of Classification Search
CPC ....... H04N 21/26208; H04N 21/26216; H04N 21/26233; H04L 21/2809; H04L 21/2801
See application file for complete search history.

(56) References Cited

U.S. PATENT DOCUMENTS

| | | | |
|---|---|---|---|
| 6,925,502 | B1 | 8/2005 | Abbasi et al. |
| 9,042,244 | B2 | 5/2015 | Senga |
| 9,485,184 | B2 | 11/2016 | Mehrotra et al. |
| 10,257,097 | B1 | 4/2019 | Kandasamy et al. |
| 10,263,894 | B2 | 4/2019 | Lopez Serrano et al. |
| 10,320,526 | B1 | 6/2019 | Ho |
| 10,375,192 | B1 | 8/2019 | Lepeska |
| 2002/0010938 | A1 | 1/2002 | Zhang et al. |
| 2002/0097722 | A1 | 7/2002 | Liao et al. |
| 2003/0103452 | A1 | 6/2003 | Le et al. |
| 2003/0179719 | A1 | 9/2003 | Kobayashi et al. |
| 2004/0044761 | A1 | 3/2004 | Phillipi et al. |
| 2004/0215746 | A1 | 10/2004 | McCanne et al. |
| 2005/0259577 | A1 | 11/2005 | Sin |
| 2007/0002946 | A1* | 1/2007 | Bouton ................ H04N 19/162 375/E7.13 |
| 2007/0076726 | A1 | 4/2007 | Weston et al. |
| 2010/0182905 | A1 | 7/2010 | Matsushita et al. |
| 2011/0261691 | A1 | 10/2011 | Jin et al. |
| 2012/0016965 | A1* | 1/2012 | Chen ................ H04N 21/23439 709/219 |
| 2013/0163667 | A1* | 6/2013 | Nilsson .............. H04N 21/6377 375/240.12 |
| 2013/0291032 | A1* | 10/2013 | Nilsson ............ H04N 21/64738 725/93 |
| 2013/0297743 | A1 | 11/2013 | Eschet et al. |
| 2014/0032781 | A1 | 1/2014 | Casey et al. |
| 2014/0169164 | A1 | 6/2014 | Oguchi |
| 2014/0282792 | A1 | 9/2014 | Bao et al. |
| 2014/0286258 | A1 | 9/2014 | Chowdhury et al. |
| 2014/0297813 | A1* | 10/2014 | Gomes ................... H04L 65/80 709/219 |
| 2015/0085665 | A1 | 3/2015 | Kompella et al. |
| 2015/0236966 | A1 | 8/2015 | Francini et al. |
| 2015/0271073 | A1 | 9/2015 | Saladi et al. |
| 2016/0072637 | A1 | 3/2016 | Gholmieh et al. |
| 2016/0072723 | A1 | 3/2016 | Shanmuganathan et al. |
| 2016/0080241 | A1 | 3/2016 | Rocha De Maria et al. |
| 2016/0094465 | A1 | 3/2016 | Park et al. |
| 2016/0105469 | A1 | 4/2016 | Galloway et al. |
| 2017/0126574 | A1 | 5/2017 | Goel et al. |
| 2017/0149666 | A1 | 5/2017 | Kiykioglu et al. |
| 2017/0214625 | A1 | 7/2017 | Dhanabalan et al. |
| 2017/0331753 | A1 | 11/2017 | Li et al. |
| 2019/0364311 | A1 | 11/2019 | Nilsson et al. |
| 2020/0412783 | A1 | 12/2020 | Nilsson et al. |

FOREIGN PATENT DOCUMENTS

| | | | |
|---|---|---|---|
| CN | 101658035 | A | 2/2010 |
| CN | 101977151 | A | 2/2011 |
| CN | 102088640 | A | 6/2011 |
| CN | 103929370 | A | 7/2014 |
| CN | 104125159 | A | 10/2014 |
| CN | 104488265 | A | 4/2015 |
| EP | 1463228 | A2 | 9/2004 |
| EP | 1578070 | A1 | 9/2005 |
| EP | 2053799 | A1 | 4/2009 |
| EP | 1463228 | B1 | 12/2012 |
| EP | 2928145 | A1 | 10/2015 |
| GB | 2516112 | A | 1/2015 |
| JP | 2008278207 | A | 11/2008 |
| WO | WO 2018114519 | A1 | 6/2018 |
| WO | WO2018114520 | A1 | 6/2018 |
| WO | WO-2018121990 | A1 * | 7/2018 ....... H04N 21/23439 |

OTHER PUBLICATIONS

International Preliminary Report on Patentability for Application No. PCT/EP2017/082589, dated Jul. 4, 2019, 8 pages.
International Preliminary Reporton Patentability for Application No. PCT/EP2017/082671, dated Jul. 11, 2019, 9 Pages.
Communication pursuant to Article 94(3) EPC for European Application No. 17817730.9, dated Nov. 12, 2020, 6 pages.
Office Action for Chinese Application No. 201780081507.6, dated Jan. 6, 2021, 19 pages.
Office Action for Chinese Application No. 201780084079.2, dated Feb. 3, 2021, 25 pages.
U.S. Appl. No. 16/472,394, filed Jun. 21, 2019, Inventor(s): Nilsson et al.
Application and Filing Receipt for U.S. Appl. No. 16/472,427, filed Jun. 21, 2019, Inventor(s): Nilsson et al.
European Search Report for Application No. EP 16 20 5777, dated Apr. 18, 2017 (9 pgs).
Great Britain Search Report for Application No. GB 1621855.4, dated Apr. 27, 2017 (5 pgs).
International Search Report for Application No. PCT/EP2017/082590, dated Feb. 21, 2018 (3 pgs).
Extended European Search Report for Application No. 16205772.3, dated Jun. 30, 2017 (7 pgs).
GB Search Report for Application No. 1621854.7, dated Jun. 7, 2017 (1 pg).
International Search Report for Application No. PCT/EP2017/082589, dated Apr. 13, 2018 (5 pgs).
UC Berkeley student project, 2005, "A comparative analysis of TCP Tahoe, Reno, New-Reno, SACK and Vegas," Obtained from: [http://inst.eecs.berkeley.edu/~ee122/fa05/projects/Project2/SACKRENEVEGAS] (7 pgs).
Office Action for Chinese Application No. 201780081507.6, dated Aug. 23, 2021, 10 pages.
Office Action for Chinese Application No. 201780081507.6, dated Feb. 11, 2022, 8 pages.

* cited by examiner

TRANSMISSION PARAMETER CONTROL FOR SEGMENT DELIVERY

CROSS-REFERENCE TO RELATED APPLICATION

The present application is a National Phase entry of PCT Application No. PCT/EP2017/082671, filed Dec. 13, 2017, which claims priority from European Patent Application No. 16207404.1, filed Dec. 29, 2016, each of which is fully incorporated herein by reference.

TECHNICAL FIELD

This disclosure relates to techniques for controlling transmission parameters for delivering segments over a network in accordance with a delivery schedule.

BACKGROUND

There is an increasing demand for delivering media content (e.g. audio and/or video content) over networks.

One approach for delivering a stream of content over a network is to segment the content stream into a plurality of temporal segments. Each segment can then be communicated over the network in the form of a series of data packets. An example of such an approach is adaptive bitrate delivery.

In adaptive bitrate delivery, a media content stream is separately encoded at multiple bitrates to produce multiple encoded streams. If the media content comprises audio and video content (so that the media stream comprises an audio stream and a video stream), each of the audio and video streams may be encoded separately and at multiple bitrates to produce a plurality of encoded video streams and a plurality of encoded audio streams. Each encoded media stream is segmented into a plurality of temporal segments. Each temporal segment may contain between 2 and 15 seconds' worth of decoded media content, for example. The segmentation of the media content may occur before or after the media stream(s) are encoded. The segments of media content are then communicated over the network to a receiver device as a series of data packets.

The bitrate of each segment of media content delivered to the receiver can be selected from the set of bitrates at which the content is encoded, where the bitrate selected is dependent on the network throughput conditions. Thus, the receiver device may receive segments of media content at different encoded bitrates. This bitrate may be requested by the receiver or selected by the sender.

An example of an encoding scheme in which content is segmented into a plurality of segments is constant quality encoding (CQE). The aim of constant quality encoding is to encode and deliver each segment of content at a fixed perceived, or subjective quality. Constant quality encoding is based on the idea that the encoded bit rate required to achieve a given perceived quality of delivered content is variable. For example, certain segments of video content, such as fast-moving sport, may require a relatively higher bit rate encoding to achieve a given perceived quality compared to other segments, such as slow-moving or static scenes. Thus, in constant quality encoding, each segment is encoded with a bit rate proportionate to the demands of the content in that segment.

An advantage of constant quality encoding is that a delivered content stream will have consistent perceived quality throughout.

However, one difficulty associated with constant quality encoding is scheduling the delivery of the content segments. If, when scheduling a segment for delivery, the bit rate demands of subsequent segments are not taken into account, it is possible that the need to adapt the encoding bit rate of the segment to take into account network throughput conditions may cause the segments to be delivered with bit rates close to, or representing, constant bit rate encoding. For example, a segment being scheduled for delivery may require a relatively high encoded bit rate to achieve the desired perceived quality, but due to network throughput conditions at the time for delivery, needs to be delivered at a lower bit rate, leading that segment to be delivered at a perceived quality lower than the desired perceived quality.

SUMMARY

According to one aspect of the present disclosure there is provided a method of delivering a video sequence in a network, the sequence comprising a plurality of temporal segments each encoded at a plurality of qualities, the method comprising: computing a dataset indicating the relative size of the temporal segments of the video sequence; computing a representative decoding schedule for the temporal segments of the video sequence as a cumulative function of the relative size of temporal segments of the video sequence; and computing in dependence on the representative decoding schedule a representative delivery schedule for delivery of the temporal segments of the video sequence, the representative delivery schedule indicating a target delivery time for each temporal segment of the video sequence, each target delivery time being no later than the decoding time of the temporal segment indicated by the representative decoding schedule, and each target delivery time being independent of the encoded quality of each segment; for each segment: setting one or more transmission parameters for the segment in dependence on the target delivery time for the temporal segment and the relative size of the temporal segment; and delivering the temporal segment over the network using the one or more transmission parameters.

The one or more transmission parameters may comprise a quality at which the temporal segment is encoded and/or a congestion window size for transmitting the temporal segment.

The representative delivery schedule may be a piecewise linear curve with a monotonically decreasing slope.

The method may further comprise, for each temporal segment subsequent to a first temporal segment determining one or more delivery parameters associated with the delivery of a previously delivered temporal segment; and setting the one or more transmission parameters further in dependence on the delivery parameter for the previously delivered temporal segment.

The one or more delivery parameters may comprise a parameter indicative of the difference between the delivery time of the previously delivered temporal segment and the target delivery time of the previously delivered temporal segment.

The one or more delivery parameters may comprise a packet loss rate associated with the delivery of the previously delivered temporal segment.

The dataset may be a representative set of relative segment sizes for the plurality of qualities that indicates a representative relative size for each segment.

The method may further comprise: generating, from a plurality of sets of segment sizes each indicating the relative size of the temporal segments at a respective quality, the representative set of relative segment sizes for the plurality of qualities; and storing the representative set as the dataset.

The representative set may be generated from a mathematical average of the sets of segment sizes for the plurality of qualities.

The size of each segment in the representative set may be selected from one of the sets of segment sizes indicating the relative size of the temporal segments at a respective quality.

The method may further comprise updating the time schedule during delivery of the temporal segments to revise the target delivery times for temporal segments yet to be delivered over the network.

The time schedule may be updated in response to a temporal segment being delivered at a time after its target delivery time.

The time schedule may be updated using a linear interpolation from the delivery time of the most recently delivered temporal segment to the target delivery time of a critical segment next occurring in the video sequence, wherein a critical segment is such that transmission rates for temporal segments subsequent to the critical segment calculated from the initial time schedule are less than calculated transmission rates for temporal segments prior to the critical segment.

The time schedule may be updated so that the revised target delivery time for a segment n to be delivered, RTD(n), is calculated as $$RTD(n) = ATD(m) + (TD(n) - TD(m)) \times \frac{TD_{Cp} - ATD(m)}{TD_{CP} - TD(m)},$$

where ATD(m) is the actual time of delivery for a segment m delivered after its target delivery time TD(m), TD(n) is the prior target delivery time for the segment n, and $TD_{CP}$ is delivery time of the next critical segment in the video sequence.

The time schedule may be updated after the delivery of each segment.

According to a second aspect of the present disclosure there is provided a data transmitter configured to deliver a video sequence comprising a plurality of temporal segments encoded at a plurality of qualities over a network, the transmitter comprising: a parameter calculation unit configured to a) compute a representative decoding schedule for the temporal segments of the video sequence from a dataset indicating the relative size of segments of the video sequence, the representative decoding schedule being a cumulative function of the relative size of temporal segments of the video sequence, b) compute in dependence on the representative decoding schedule a representative delivery schedule for delivery of the temporal segments of the video sequence, the representative delivery schedule indicating a target delivery time for each temporal segment of the video sequence, each target delivery time being no later than the decoding time of the temporal segment indicated by the representative decoding schedule and each target delivery time being independent of the encoded quality of each temporal segment, and c) for each segment, set one or more transmission parameters for the temporal segment in dependence on the calculated target delivery time for the temporal segment and the relative size of the temporal segment; and a dispatch unit configured to deliver each temporal segment over the network using the one or more transmission parameters for that temporal segment.

BRIEF DESCRIPTION OF THE DRAWINGS

The present disclosure will now be described by way of example with reference to the accompanying drawings. In the drawings.

DETAILED DESCRIPTION

Figure 1:
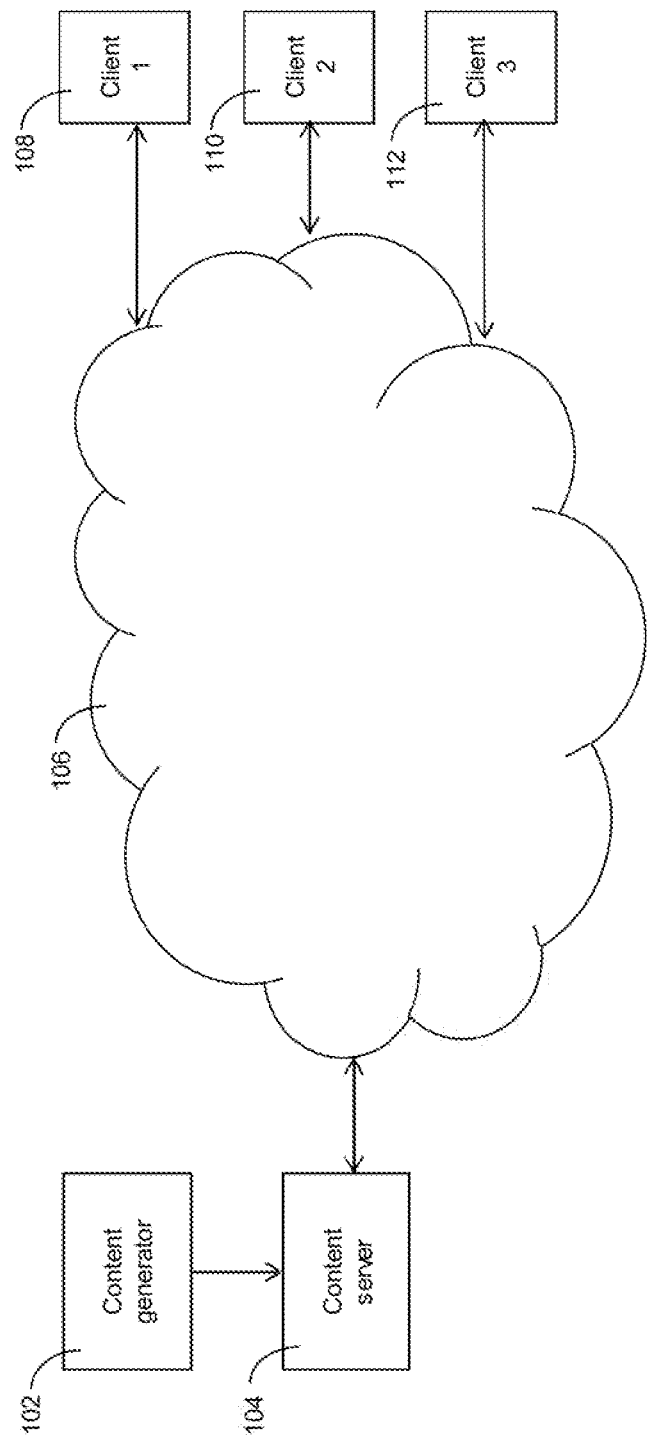
FIG. 1 shows an example of a communication network.

The present disclosure describes techniques for delivering content over a network by controlling the transmission parameters of content data segments in dependence on target delivery times associated with each segment. The content may be encoded into multiple streams of segments, with each stream at a different constant quality level (i.e. each stream of segments represents the content at a particular quality level). Each segment is therefore encoded at multiple quality levels (and so encoded at multiple different bit rates). The transmission parameters for a segment may include the encoded quality of the segment and/or the congestion window used to deliver the segment. It is to be noted that the encoded quality of a given segment relates to the number of bits used to encode the segment (so that a given segment at a higher encoded quality is encoded using more bits than that used to encode the segment at a lower quality), and is distinct from the subjective, or perceived quality of the segment. As described above, two segments may require different encoded bit rates to achieve the same perceived quality at playout.

The target delivery time of a given segment is chosen in accordance with the relative size of one or more subsequent segments to be delivered, but is independent of the bit rate at which the segment is encoded. The relative size of a segment may be defined, or expressed, with respect to a normalized number of bits. For example, the relative size of a segment may be defined relative to the average segment size of the segments expressed in a normalized number of bits. Thus, the relative size of a segment is indicative of the relative bit rate demands for that segment needed to achieve a given perceived quality, and is independent of the encoded bit rate of the segment. That is, the relative size of a segment is indicative of the data demands of that segment.

As an illustration, the deadline for delivery of a first segment of a relatively small size (i.e. a segment needing a relatively lower bit rate to achieve a given perceived quality) may be chosen to be at a time earlier than that required to deliver the segment in time for decoding, i.e. earlier than that required to avoid play-out stalling. This may enable a build-up of data in the buffer, allowing more time for the delivery of a subsequent segment having a larger relative size. By setting the target deadline delivery for the first segment in this way, the transmission parameter(s) set for that segment may cause the segment to be delivered at a lower encoded bit rate than may otherwise be the case. However, as the first segment requires relatively fewer bits to achieve a given perceived quality, the perceived quality of the segment may be maintained (e.g. at a desired or pre-set level). For a subsequent second segment of a relatively large size, the target times of the previous segment (and the corresponding build-up of data in the receiver buffer ahead of play-out time these cause) enables the target delivery time for that second segment to be set that provides more time for delivery of that segment than may otherwise be the case. This in turn causes the transmission parameters for that second segment to be set in a way that causes the second segment to be delivered at a higher encoded bit rate than may otherwise be the case, allowing the perceived quality to be maintained at the desired or pre-set level.

Thus, the techniques described herein enable a communication system to deliver media content (e.g. a video sequence) with a more consistent perceptual quality than pure bit-rate driven adaptive streaming systems, and may be particularly suitable for delivering content encoded into constant quality representations using adaptive bit rate delivery. More detailed examples of how this may be achieved are described below.

For the purposes of clarity, in the following examples media content is delivered over a network using adaptive bit rate delivery in accordance with an HTTP and underlying TCP protocol. The HTTP protocol could for example be an HTTP Adaptive Streaming protocol, such as the HTTP Live Streaming (HLS) protocol, MPEG-DASH, SmoothStreaming, Adobe HTTP Dynamic Streaming etc. The TCP protocol could be any suitable protocol, such as TCP Reno, TCP New Reno, TCP Cubic, TCP Tahoe, TCP Vegas, etc.

FIG. 1 shows an example of a communication system 100. The system comprises a content transmitter (in the form of a server) 104 and a plurality of receivers (in the form of content clients) 108, 110 and 112 separated by a communication network 106. The network 106 could be a wireless network, a wired network, or a combination of a wired and wireless network. The network 106 could be (or could form part of) a distributed computing network, such as the internet.

The content server 104 is shown communicatively coupled to a content generator 102. The content generator 102 may be configured to encode media content and to communicate the media content to the content server 104. As described above, the media content could comprise video and/or audio streams. The content generator 102 may be configured to encode the video stream separately at multiple different bit rates to generate multiple encoded video streams each encoded at a different bit rate. In other words, the video stream may be encoded at multiple different encoded qualities. The video content could for example be encoded according to the ITU-T H.264 standard, though of course other standards may also be used. If the media content additionally comprises audio content, then this may be encoded at only a single bit rate (to generate a single encoded audio stream) or at multiple bit rates to generate respective encoded audio streams. One example of the standard for encoding the audio stream is MPEG-4 HE AAC, but of course other standards may alternatively be used. The content generator 102 may also be configured to segment the media content into a plurality of discrete temporal segments. If the media content was encoded at multiple bitrates, each encoded stream may be segmented. The, or each, content stream could be segmented before or after encoding. That is, a content stream may be segmented, with each resulting segment then encoded at different bit rates; or each encoded content stream could be segmented to generate a plurality of encoded segments.

The content server 104 is configured to receive media content from content generator 102 and may store the received content. As indicated above, the media content received by the content generator 102 may be encoded and segmented. The content server may communicate, or deliver, the media content to one or more of the clients 108, 110 and 112 via the network 106. The content server 104 could be a video streaming server, and may deliver video (and/or audio) content on request to the clients. Thus, the client devices 108, 110 and 112 may be adapted to request media content from the server 104. The client devices could for example be a suitably configured set-top box, PC, laptop, smartphone, tablet, smart TV, etc.

Described below are techniques for controlling the transmission parameters associated with segments to be delivered over the network 106 using a timing schedule indicating target times for the delivery of each segment. For clarity and purposes of illustration, the following description is made with respect to an example server and client that both have the full functionality required to implement the techniques described. It will be appreciated that it is not necessary for both the server and client to have this full functionality, so long as the necessary functionality is distributed between the server and client, which may be done in various ways.

Figure 2:
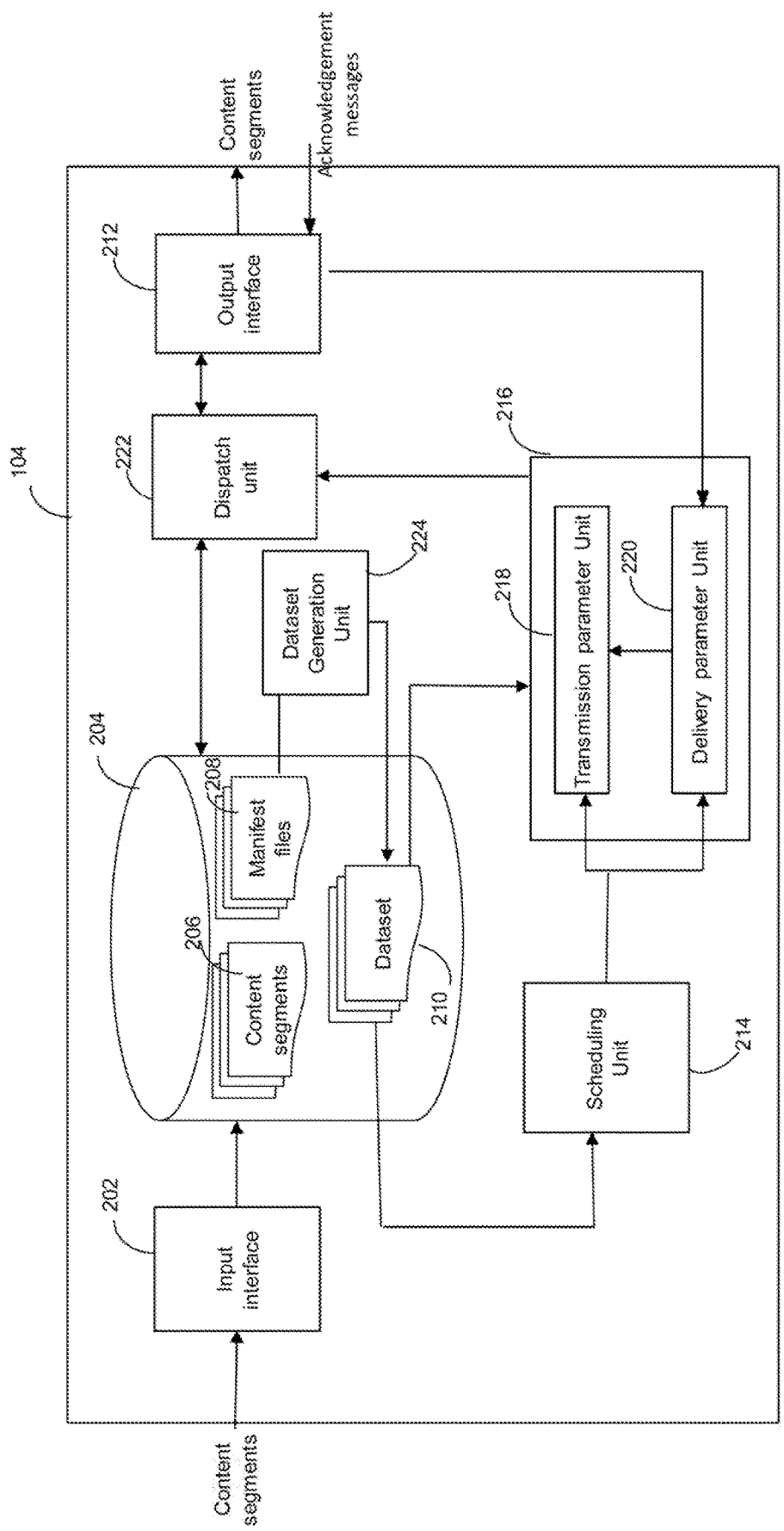
FIG. 2 shows an example of a server forming part of the network in FIG. 1.

Server 104 is shown in more detail in FIG. 2. The server comprises an input interface 202; a data store 204 and an output interface 212. The server further comprises a scheduling unit 214, a dataset generation unit 224, a parameter calculation unit 216 and a dispatch unit 222. The scheduling unit is coupled to the parameter calculation unit, which itself is additionally coupled to the dispatch unit. The parameter calculation is shown in this example as comprising a transmission parameter unit 218 and a delivery parameter unit 220.

The content server 104 may be configured to receive the encoded content segments from the content generator at the input interface 202 and to store the received encoded segments 206 in the data store 204. Each content segment may be associated with a manifest file 208 that may contain information on the bit rates at which the associated content segment was encoded, and an indication of where the associated content segment is stored within the store 204 of the server. Each manifest file may also optionally store an indication of the duration of the media content encoded in the associated content segment. The manifest files may also be stored in the store 204. Each content segment is transmitted from the server via the output interface 212 as a series of data packets. That is, each segment of content data is formed of a plurality of data packets. The content server 104 may also receive via the interface 212 acknowledgement packets from one or more content clients to which the server has transmitted data packets. The communication system may be arranged so that the content server receives an acknowledgement packet for each data packet successfully delivered to a client over the network. The operation of the scheduling unit 214, the parameter calculation unit 216, the dataset generation unit 224 and the dispatch unit 222 will be described in more detail below with reference to FIG. 4.

Figure 3:
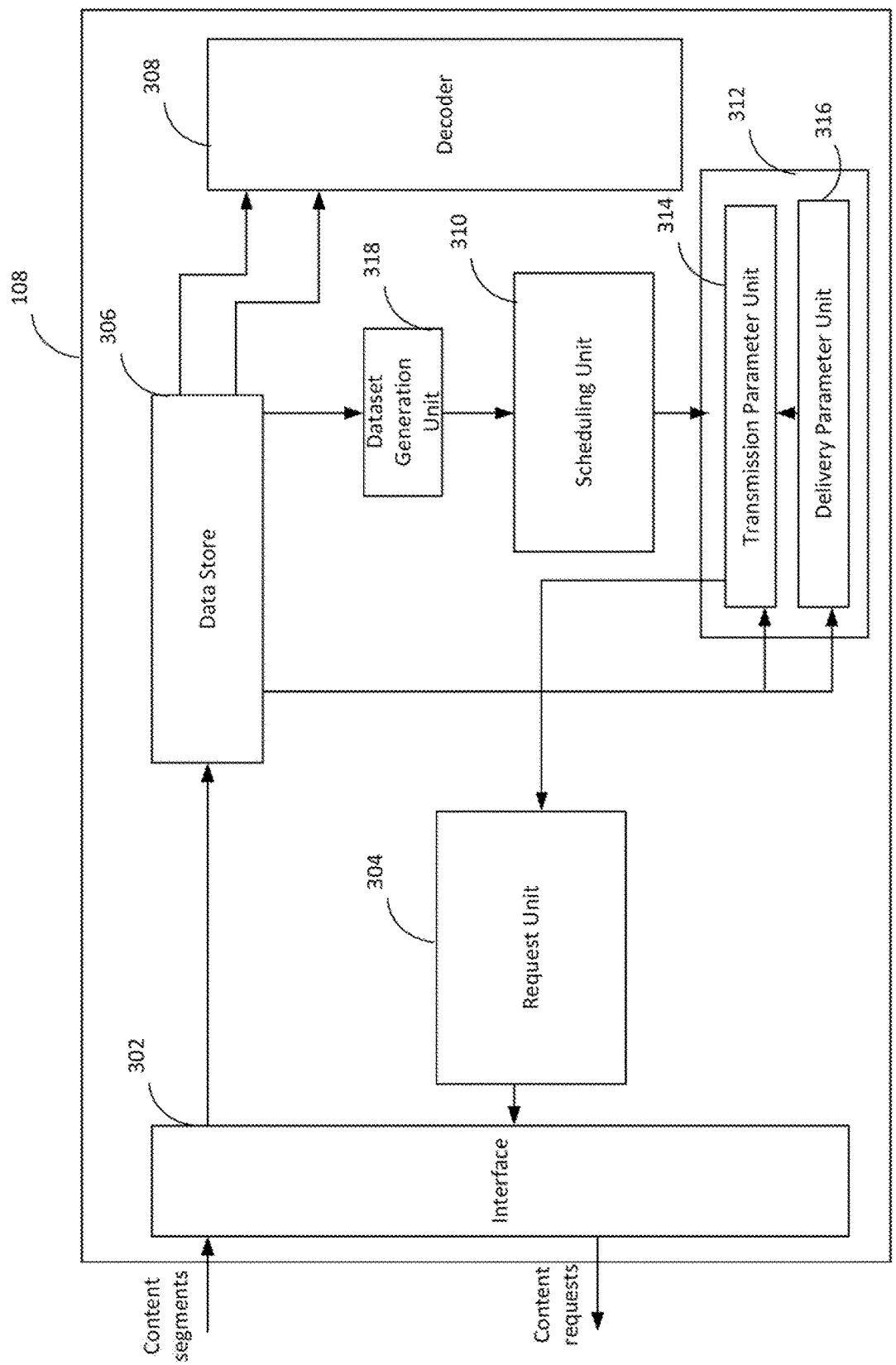
FIG. 3 shows an example of a client forming part of the network in FIG. 1.

A client (which, for the purposes of illustration, is client 108) is shown in more detail in FIG. 3.

The client 108 comprises an input interface 302 configured to receive data packets transmitted over the network 106 from server 104. Data packets received via the input interface 302 are input into a content data store 306. The content store may store received data packets until a suitable time for playout to a user. Data stored in the content store 306 is communicated to a content decoder 308. The decoder 308 operates to decode the received data packets for output to a user. The content decoder could comprise a video decoder and audio decoder, for example.

The client 108 additionally comprises a request unit 304. The request unit may operate to request data, or content, e.g. from server 104. The request unit 304 may generate a data request message and cause the request message to be transmitted to the server via the interface 302. For example, if the server and client operated according an HTTP Adaptive Bit Rate Delivery protocol, the client 108 may send media content requests to a source node in the form of an HTTP GET request.

The client 108 further comprises a scheduling unit 310, dataset generation unit 318 and a parameter calculation unit 312. The scheduling unit is coupled to both the content store 306 and the parameter calculation unit 312. The parameter calculation unit is coupled to the request unit 304 and comprises a transmission parameter unit 314 and a delivery parameter unit 316.

The method of delivering the stream of data segments over the network 106 will now be described with reference to FIG. 4.

At 402, a dataset 210 indicating the relative size $S_r(n)$ of each segment n of a plurality of segments is stored. The plurality of segments may form a stream of content, such as a video sequence. The relative size of a segment may be a normalized size, e.g. expressed with respect to a normalized number of bits. As such, the relative size of the segment may be independent of the encoded bit rate for that segment (i.e. independent of the encoded quality of the segment). The size of each segment may be normalized by the total number of bits of the plurality of segments at a particular encoding quality. The relative size of a segment may be expressed relative to an average segment size for the plurality of segments.

The dataset may be stored in the data store 204 of the server, or the content store 306 of the client. The dataset may contain information on the (absolute) size of each segment for each of the plurality of encoded bit rates (i.e. at each encoded quality).

At 404, a time schedule is computed in dependence on the dataset 210 for delivery of the segments that indicates a target delivery time $T_D(n)$ for each segment.

Figure 5:
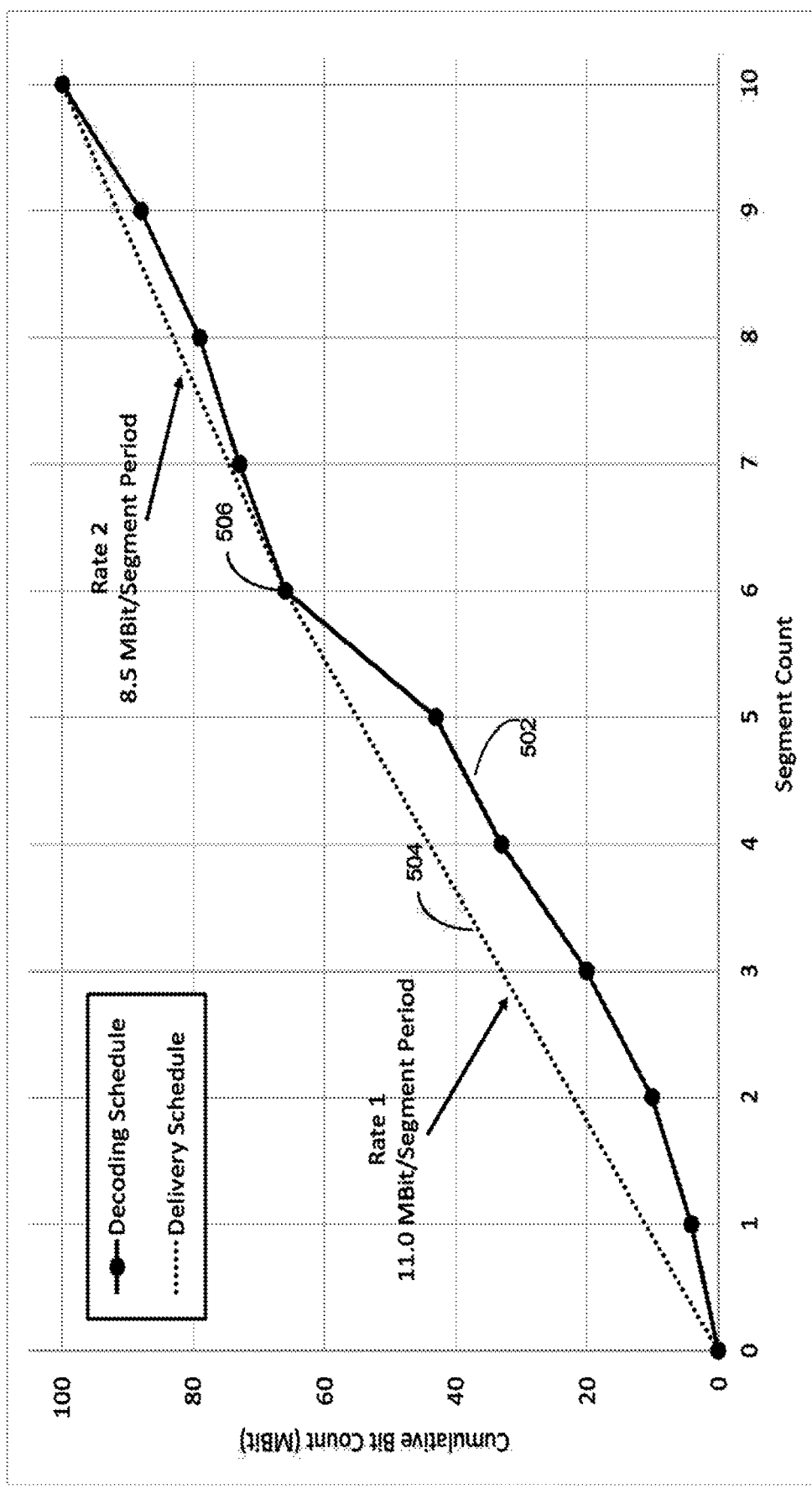
FIG. 5 shows decoding and delivery schedule for constant quality encoded content encoded at a single quality level.

An illustration of how a time schedule may be computed from the sizes of the segments will first be described with reference to FIG. 5. FIG. 5 shows a graph plotting cumulative bit count (on the y-axis) against time expressed in units of segment playout duration (on the x-axis) for a piece of content encoded as ten video segments. In this example, each of the segments is of equal duration, for example each segment may contain ten seconds' worth of video data, and the content is encoded according to a constant quality encoding. The line 502 shows the total number of bits that need to be delivered as a function of time to avoid play-out of the video content stalling at the client. Line 502 is a cumulative bit curve, and represents a decoding schedule. The decoding schedule specifies the bit rate at which each segment must be delivered in order to avoid play-out stalling, i.e. the bit rate at which each segment must be delivered in order to be decoded in time for playout. This bit rate is defined by the gradient of the line 502. The solid circular markings indicate the cumulative number of bits for an integer number of segments. The absolute size of a segment is therefore equal to the vertical height between two adjacent circular markings. For example, the absolute size of the second segment is equal to the vertical height between the circular marking with a decoding time of two segment durations and the circular marking with a decoding time of one segment duration. It can be seen that some segments are encoded by a greater number of bits than other segments. For example, segment six is encoded by a relatively large number of bits (and so may encode a relatively demanding segment of content), whereas segment one is encoded by a relatively small number of bits (and so may encode a relatively undemanding segment of content).

A delivery schedule that specifies a delivery rate for each segment is then determined from the decoding schedule. The delivery schedule may be a piecewise schedule specifying one or more delivery bit rates each associated with a respective subset of consecutive segments. That is, the delivery schedule specifies a bit rate for delivery for each segment. The delivery schedule is shown in FIG. 5 by the dotted line 504. The piecewise delivery schedule is such that the bit rates for sections of the schedule are monotonically decreasing. In this example, the delivery schedule comprises two sections, each associated with a different delivery rate. The first section specifies a delivery rate of 11 Mbit/segment period for the first six segments to be delivered, and the second section specified a delivery rate of 8.5 Mbit/segment period for the last four segments to be delivered. Each delivery rate is such that it is sufficient to deliver all the segments associated with that rate in time for decoding. That is, in this example, a delivery rate of 11 Mbit/segment period is sufficient to deliver the first six segments in time for decoding, and a delivery rate of 8.5 Mbit/segment period is sufficient to deliver the final four segments in time for decoding.

The points at which the delivery rate specified by the delivery schedule monotonically decreases are known as the "critical points". A critical point is also the point at which the delivery schedule is equal to the decoding schedule. A critical point may define what is referred to herein as a critical segment, which is a segment having a target delivery time specified by the delivery schedule equal to the decoding time specified by the decoding schedule. A critical segment may also be such that segments immediately subsequent to the critical segment have a delivery rate specified by the delivery schedule that is less than the specified delivery rate of the critical segment. Point 506 is an example of a critical point, and segment six an example of a critical segment.

It can be seen with reference to FIG. 5 how the delivery schedule 504 can be used to define a target delivery time for each segment. The target delivery time of a segment is equal to the x-coordinate of the point on the delivery schedule 504 having the same y-coordinate as the solid circular marking on the decoding schedule for that segment.

Whilst the above explanation illustrates how a timing schedule may be determined, it will be noted that FIG. 5 depicts the cumulative bit count for content at a single encoding quality level (i.e. each segment is encoded at one bit rate only). However, adaptive bit rate delivery requires that the content is encoded as multiple streams of segments, with each stream at a different encoding quality (i.e. each segment is encoded at multiple bit rates).

To illustrate how target delivery rates for segments of content can be determined when the content is encoded at multiple quality levels, reference will be made to FIGS. 6 to 8.

Figure 6:
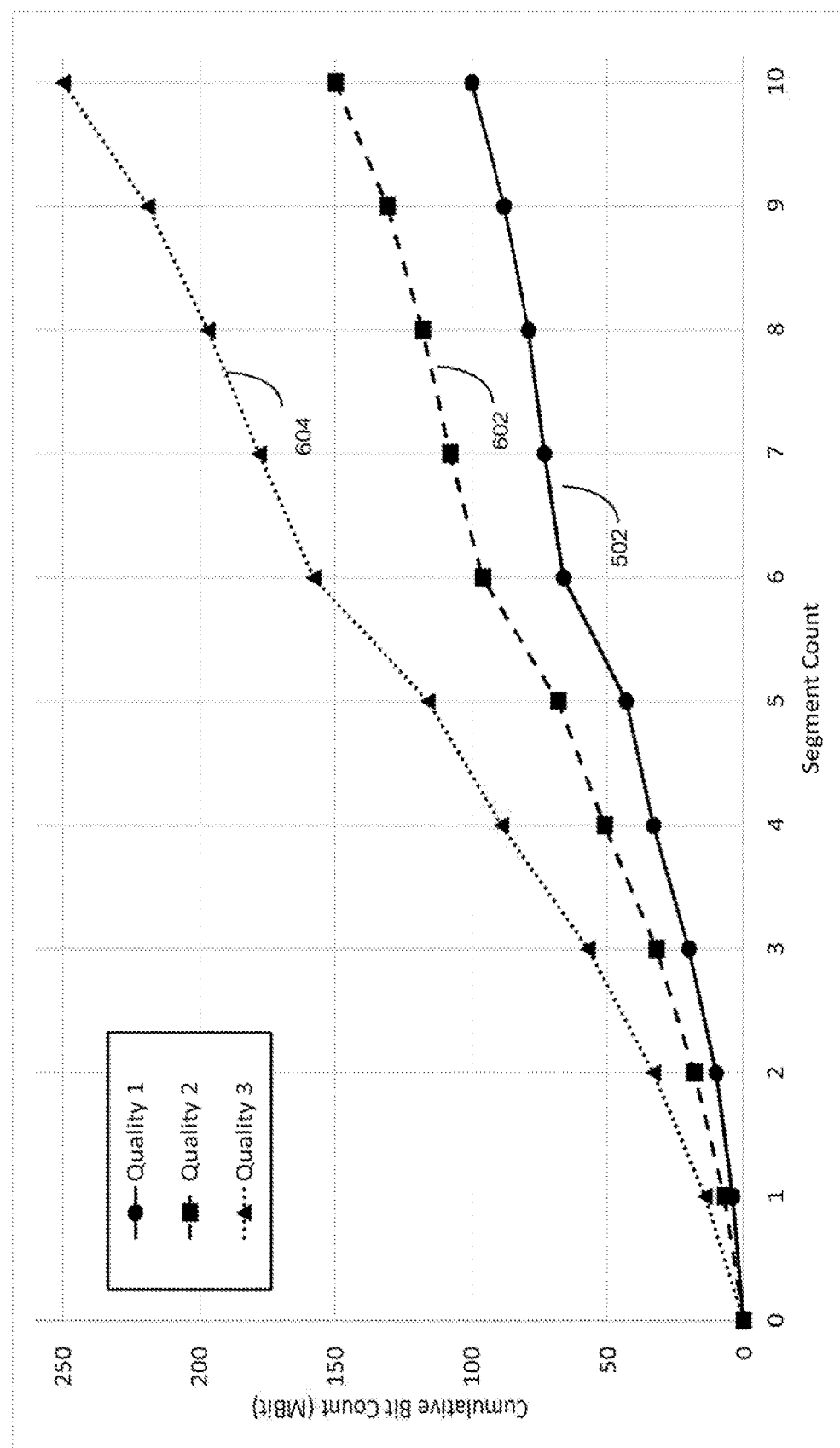
FIG. 6 shows a decoding schedule for constant quality encoded content encoded at three different quality levels.

FIG. 6 shows the cumulative bit curves for the ten segments of content at two further encoding qualities. All three cumulative bit curves shown in FIG. 6 are for the same piece of content. Line 604 shows the decoding schedule for the piece of content at the highest quality encoding, line 602 shows the decoding schedule for the piece of content at the next highest quality encoding, and line 502 shows the decoding schedule for the piece of content at the lowest quality encoding.

The decoding schedules for each encoded quality represented by curves 502, 602 and 604 may be generated from a dataset that includes multiple sets of segment sizes (e.g. in bits), each set indicating the size of the segments at a respective quality. Thus, in this example the dataset might include three sets of segment sizes. The temporal duration of each segment (e.g. in seconds) may also be stored. This information may be stored at the transmitter 104, for example in the store 204. Information on the size of the segments at each encoded quality (and the temporal duration of the segments) may form part of the manifest files 208. This information may also be stored at the receiver 108, for example at the data store 306.

It has been realized that the shapes of the decoding schedules 502, 602 and 604 are approximately the same. This is because the relative size of a segment (e.g. the size of a segment (in bits) relative to the total number of bits for all the segments at a given encoding quality) is dependent on the nature of the content encoded by that segment (e.g. fast-moving sports content or slow-paced drama) and not the quality (and hence bit rate) at which it was encoded. In other words, the relative size of a segment is independent of the encoded bit rate of the segment. This may be expressed by the following equation, in which the number of bits b required to encode a given segment of content is:

$$b = fg \qquad (1)$$

In equation (1), f characterizes the relative bit rate demands of the segment. That is, the parameter f is indicative of the relative demands of the content in the segment, and is independent of the encoding quality of the segment. g is a function dependent on the encoding quality, but independent of the content of the segment. Thus, a given segment at two different encoded bit rates has the same value of f (because they represent the same piece of content) but different values of g. In addition, each segment of a stream at a particular encoding quality (e.g. the stream of segments forming line 602) has the same value of g (but likely have different values of f). Expressing the sizes of the segments for each encoding quality in a normalized number of bits effectively normalizes the value of g so that the value of g for a segment is independent of the encoding quality of that segment (in other words, the value of g for the segments in a stream is the same for each encoding quality).

Figure 7:
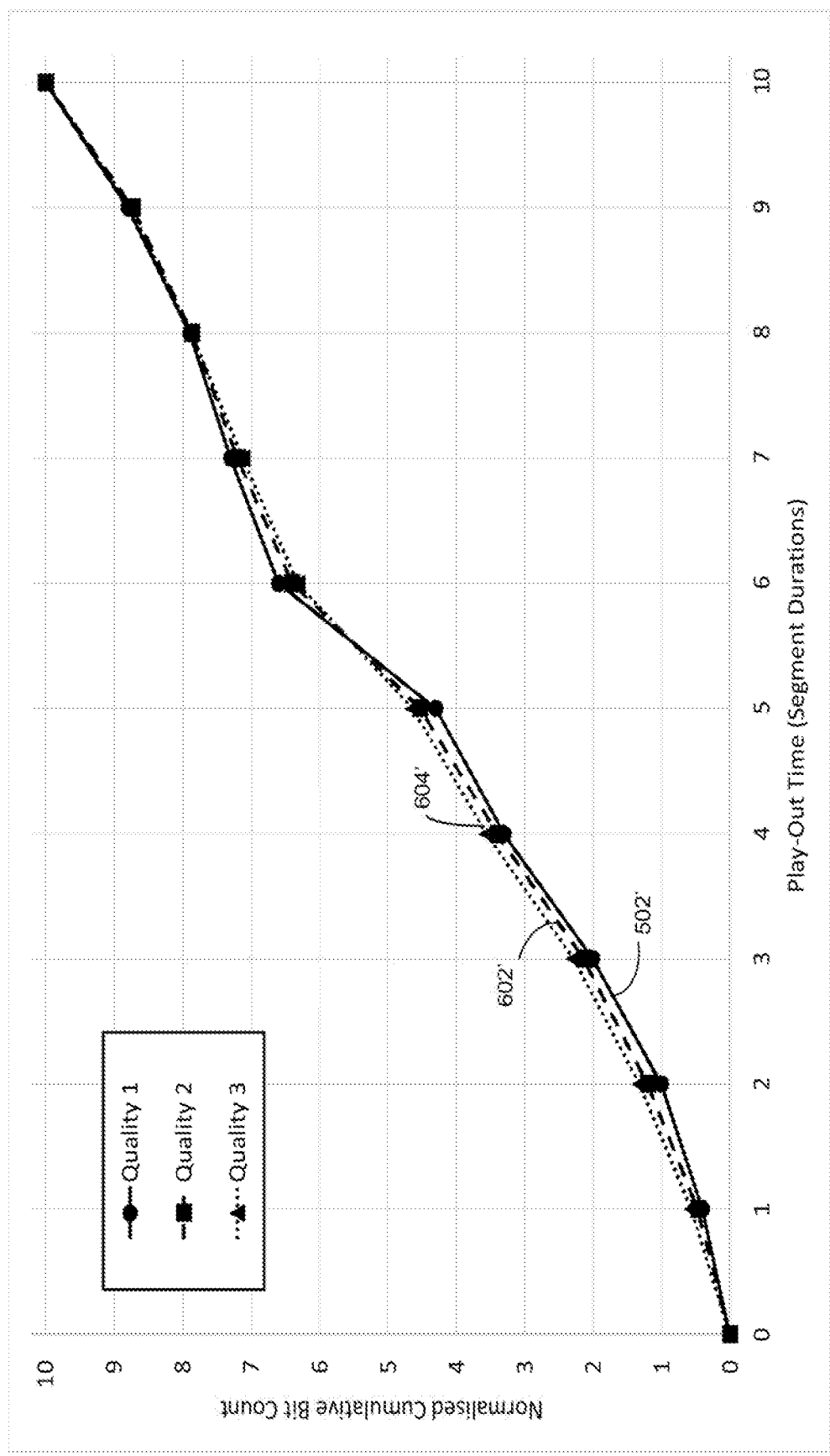
FIG. 7 shows a normalized decoding schedule for content encoded at the three different quality levels.

FIG. 7 shows the three cumulative bit curves 502, 602 and 604 expressed with respect to a normalized number of bits, so that (in this example) ten units of data need to be delivered by the play-out time of ten segments. Each normalized unit on the y-axis may therefore be regarded as a normalized average segment size. The curves 502', 602' and 604' correspond to curves 502, 602 and 604 respectively when expressed in a normalized number of bits. When the cumulative bit curves for the piece of content are expressed with respect to a normalized number of bits, they delineate approximately the same shape.

From the set of normalized cumulative bit curves 502', 602' and 604', a representative normalized cumulative bit curve can be generated. This is shown in FIG. 8, and denoted 802. The representative curve 802 therefore represents a decoding schedule indicating the delivery time for each segment to avoid play-out stalling independently of the encoded bit rate of the segment. In other words, the representative curve 802 denotes a decoding schedule for all the qualities of encoding (i.e. the decoding schedule applicable to a segment independently of the segment's encoding quality). This decoding schedule may be referred to as a representative decoding schedule.

The representative curve 802 may be generated from the set of normalized bit curves 502', 602' and 604' in a number of ways. One way to generate the curve 802 is from a mathematical average of the curves 502', 602' and 604', for example by calculating a mean, median or mode from those curves. The mathematical average may be calculated on a per-segment basis, i.e. calculated independently for each segment. Another way to generate the curve 802 is by selecting one of the normalized curves 502', 602' and 604' as the representative curve, or, for each segment, selecting a value from one of the normalized curves as the representative value (e.g. the maximum value). In the particular example shown in FIG. 8, the representative curve 802 is formed by selecting, for each segment, the largest value of the normalized curves 502', 602' and 604'. This has the advantage of generating a normalized decoding schedule for the most demanding of the individual quality levels at each segment. In other words, the decoding schedule represented by the normalized curve 802 represents the time each segment needs to be delivered in time for decoding in the worst-case scenario that the most (relatively) demanding quality level is chosen for each segment.

From the representative decoding schedule 802, a representative delivery schedule 804 can be generated that specifies a delivery rate for each segment. The delivery schedule 804 again defines piecewise constant delivery rates, where each delivery rate is associated with a consecutive subset of the segments. Point 806 represents the critical point at which the constant delivery rate defined by the delivery schedule monotonically decreases. The critical point again defines segment 6 as the critical segment. The delivery rate specified by the representative delivery schedule 804 is expressed in normalized units. In this example, the representative delivery schedule defines two constant delivery rates, with the delivery rates being expressed in units of normalized average-sized segments per segment play-out period. These delivery rates are 1.1 normalized average-sized segments per play-out period for segments 1 to 6, and 0.85 normalized average-sized segments per play-out period for segments 7 to 10.

To determine the absolute delivery rate for a particular encoding quality, the delivery rate is multiplied by the average segment size for that encoding quality. For example, with reference to FIG. 6 it can be seen that the average segment size for the highest encoded quality is 250 Mbit/10 segments=25 Mbit. Thus the delivery rate for the first six segments at the highest encoded quality=1.1×25 Mbit per segment play-out period. If the segment play-out period was 10 seconds (for example), then this would equate to a delivery rate of 2.75 Mbit/s.

Target delivery deadlines TD(n) can then be calculated for each segment 'n from the representative delivery schedule 804. The diamond markings on the delivery schedule 804 indicate the target delivery times for each segment. Specifically, the x-coordinate of each diamond marking specifies the target delivery time for a segment (specified in terms of segment durations). For example, the target delivery times for the first six segments as determined from the representative delivery schedule are: TD(1)=0.51, TD(2)=1.20, TD(3)=2.07, TD(4)=3.24, TD(5)=4.22 and TD(6)=6.00 segment periods. The target delivery times may be expressed in other temporal units (e.g. seconds) from knowledge of the segment periods in those temporal units.

The difference between the representative decoding schedule 802 and the representative delivery schedule 804 indicates the amount of data delivered to the receiver but not yet decoded and played-out. This amount of data is specified in terms of playout time, rather than in bits. As an example, the first segment is scheduled for delivery at 0.51 segment periods, and thus once delivery has completed there is 1.00−0.51=0.49 segment periods of data buffered at the receiver.

Because the target delivery times are calculated from a representative normalized cumulative bit curve, the target delivery time of each segment is independent of the encoding quality selected for that segment (i.e., independent of the value of the function g for the segment). This is advantageous because it means the target delivery times TD(n) can be used for a segment irrespective of the quality of encoding of the segment, which is particularly useful for adaptive bit rate delivery schemes where each segment is encoded at multiple different bit rates (and hence different qualities).

The target delivery times TD(n) may be calculated by the server 104 or the client 108.

With respect to the server 104, the above may be performed by the dataset generation unit 224 and the scheduling unit 214. The dataset generation unit 224 may be configured to generate the representative set of relative segment sizes (used to generate the normalized cumulative bit curve 802 illustrated in FIG. 8) from multiple sets of segment sizes, where each set indicates the size of the segments at a respective encoding quality. The sets of segment sizes at each encoded quality may be stored in the data store 204. This information may be stored in the manifest files 208, and may be received from the content generator 102.

The dataset generation unit 224 may first generate the relative size of the segments (i.e. the size of the segments expressed in a normalized number of bits) for each encoding quality. The dataset generation unit 224 may generate the relative size of the segments for each encoding quality from the absolute size of the segments at that quality and the total size (e.g. bit count) of the segments at that encoded quality. Alternatively, the relative sizes of the segments at each encoded quality may already be stored in the data store 204, for example in the manifest files. Information on the relative sizes of the segments may be received at the data store 204 from the content generator 102.

The dataset generation unit 224 then generates the representative set of relative segment sizes from the multiple sets of relative segment sizes at each encoding quality. The unit 224 could for example calculate, for each segment, the representative relative size from a mathematical average (e.g. the mean, median or mode) of the relative segment sizes for that segment at each encoding quality. Alternatively, the unit 224 could select, for each segment, the relative size of the segment at one of the encoding qualities as the representative size. The dataset generation unit 224 may then output the representative set to the data store 204.

The scheduling unit 214 may then compute a time schedule indicating the target delivery time TD(n) for each segment from the representative set of relative segment sizes 210. The scheduling unit 214 may first calculate the decoding schedule 802 from the representative set of relative segment sizes. From the decoding schedule 802, the scheduling unit 214 may calculate the representative delivery schedule 804. The scheduling unit 214 may then calculate the time schedule from the delivery schedule 804.

With respect to the client 108, the target delivery times TD(n) may be calculated by the dataset generation unit 318 and the scheduling unit 310.

The dataset generation unit 318 may generate the representative set of relative segment sizes in the same manner as the dataset generation unit 224 described above. The sets of segment sizes for each encoding quality (for the absolute and/or relative segment sizes) may be stored in the store 306. Information on the size of the segments may be received at the client 108 via the interface 302. The information may be received from the server 104 over the network 106. For example, the client 108 may receive the multiple sets of absolute segment sizes for each encoding quality via its interface 302 and store these in the store 306. The dataset generation unit 318 may then calculate the relative sizes of the segments for each encoding quality from these absolute values in the manner described above with respect to the dataset generation unit 224. Alternatively, the client 108 may receive the relative sizes of the segments for each encoding quality via its interface 302 and store these in the store 306, in which case there is no need for the dataset generation unit 318 to calculate the relative segment sizes.

The scheduling unit 310 may calculate the time schedule indicating the target delivery times TD(n) in the same manner as described above for the scheduling unit 214.

Figure 4:
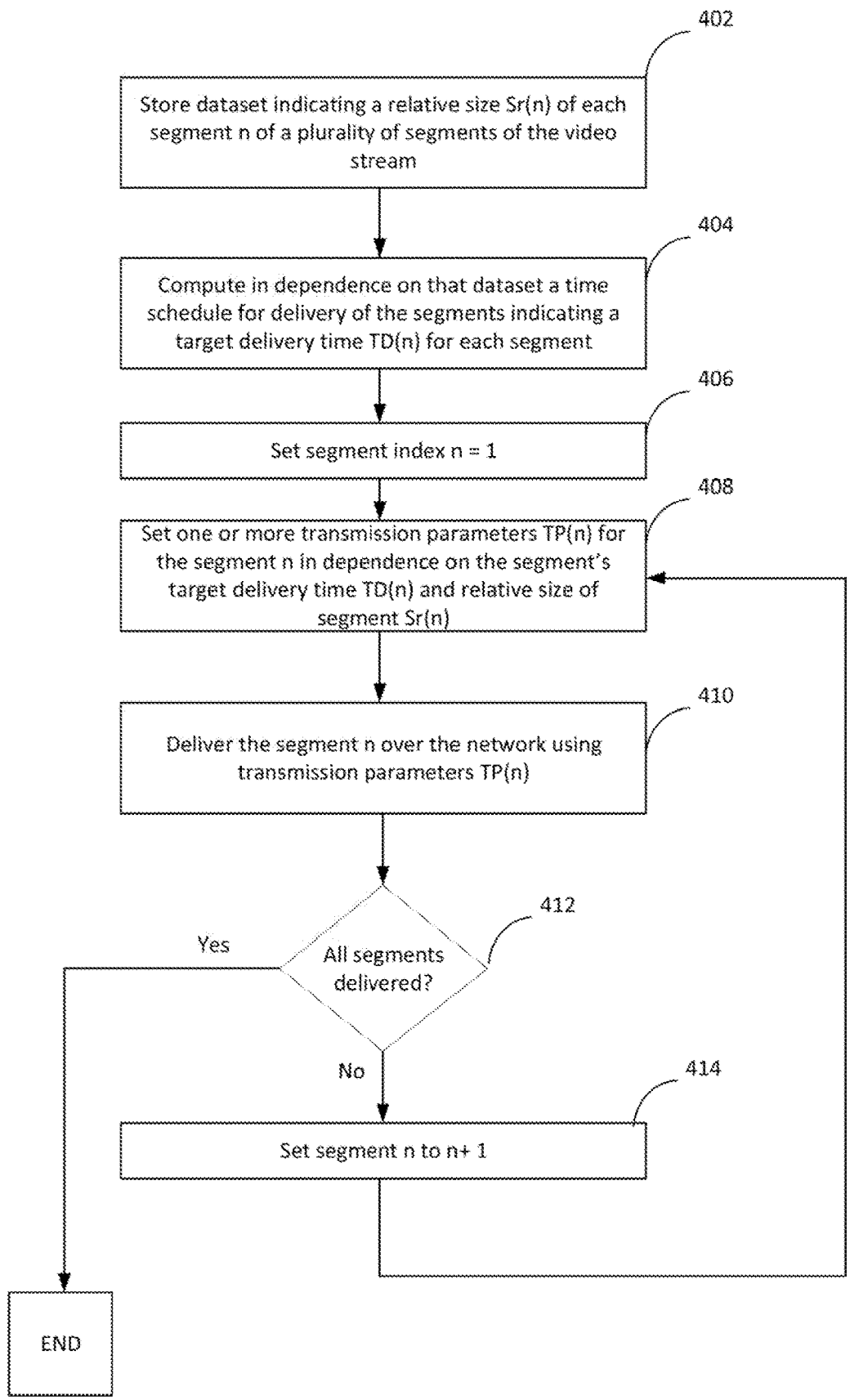
FIG. 4 shows a flowchart of a method of delivering content over a network.

Referring now back to FIG. 4, once the target delivery times TD(n) for each segment have been calculated, then at 406 the segment index n is set to '1', i.e. n=1.

At 408, one or more transmission parameters TP(n) for the segment n are set in dependence on the segment's target delivery time TD(n) and the relative size of the segment Sr(n), and at 410 the segment n is delivered over the network using the transmission parameters.

The transmission parameters may comprise the encoding quality of the segment (which may be set by selecting the encoded bit rate for the segment) and/or the congestion window size used for delivering the segment.

The target delivery time may be used to determine the available time to deliver the segment, e.g. by determining the difference between the time delivery of the segment begins and the target delivery time. Knowledge of the available time to deliver the segment and the relative size of the segment may be used to select the encoding quality of the segment and/or the congestion window size used to deliver the segment accordingly. For example, if the target delivery time for the segment indicates a relatively little amount of available time to deliver the segment, a lower encoded bit rate for the segment may be selected. A larger congestion window size may also be selected to enforce a higher transmission rate for the segment. In contrast, if the target delivery time indicates a sufficiently large amount of available time to deliver the segment, a higher encoded bit rate for the segment may be selected. In certain cases, the congestion window size may also be controlled to achieve fairness with competing traffic flows in accordance with the TCP protocol. More detailed examples of how the transmission parameters may be set will be described below.

The transmission parameters TP(n) may be calculated by the server 104 or the client 108. The server could for example receive a generic request for content from the client. In response, the server could set the transmission parameters TP(n) for each segment and deliver the segments to the client using those transmission parameters. The server may operate in this way if it is operating in an HTTP PUSH mode, for example. Alternatively, the client may calculate the transmission parameters TP(n) for each segment and include an indication of those transmission parameters in its request to the server for a content segment. The server may then receive the request including the indication of the transmission parameters TP(n) and deliver the requested content segment using the transmission parameters.

If the transmission parameters TP(n) are calculated by the server 104, they may be calculated by the transmission parameter unit 218. The transmission parameter unit 218 receives from the scheduling unit 214 the target delivery time TD(n) for the segment 'n' to be delivered. The transmission parameter unit also receives the relative size Sr(n) for the segment 'n' from the store 204. The transmission parameter unit 218 may then calculate and set the transmission parameters TP(n) for the segment n from the target delivery time TD(n) and relative size Sr(n).

The transmission parameter unit 218 then communicates the transmission parameters TD(n) for the segment n to the dispatch unit 222. The dispatch unit 222 then transmits a series of data packets via the output interface 212 to deliver the segment 'n' over the network in accordance with the transmission parameters.

The transmission parameters TP(n) may instead be calculated by the transmission parameter unit 314 of the client 108. In this case, the transmission parameter unit 314 may receive the target delivery time TD(n) for the segment n from the scheduling unit 310 and the relative size of the segment Sr(n) from the store 306. The unit 314 may then use the values of TD(n) and Sr(n) to calculate the transmission parameters TP(n) and output these parameters to the request unit 304. The request unit 304 may then issue a request for segment n that includes an indication of the calculated transmission parameters TP(n). The server would then receive the request from the client and set the transmission parameters for the delivery of segment n accordingly.

At 412 it is determined whether all the segments forming the piece of content have been delivered. If all the segments have been delivered, then the process ends. If not all the segments have been delivered, then the process proceeds to 414 where the value of n is set to n+1. Continuing our example, the value of n would be incremented to two. The process then returns to 408 and the transmission parameters TP(n) for the next segment are calculated in dependence on the next segment's target delivery time TD(n) and relative segment size Sr(n).

The above series of activities illustrates how transmission parameters for a segment may be selected using a time schedule indicating a target time for delivering the segment. By using a time schedule that is represented solely in the time domain to control the transmission parameters, the time schedule is made independent of the encoded bit rates of the segments. In other words, the same time schedule can be used to schedule the delivery of a segment irrespective of the encoded bit rate of the segment. This means that in order to effectively control the delivery of the segments to achieve a constant quality encoding, it is only required to control the transmission parameters of the segments to try and meet the target delivery times specified in the time schedule. This simplifies the delivery scheduling of the segments and enables a more consistent perceived quality for the delivered segments to be achieved.

The process described above may be enhanced by further controlling the transmission parameters TP(n) of segments to be delivered using information on the delivery of one or more preceding segments. This information may be indicated by one or more delivery parameters. The delivery parameters for a delivered segment 'm' may be denoted DP(m).

The delivery parameters DP(m) may be calculated by the delivery parameter unit 220 of the server 104 or the delivery parameter unit 316 of the client 108

Of course, the delivery parameter for a segment m can only be used to determine the transmission parameter TP(n) of a subsequent segment n to be delivered. In other words, the transmission parameters TP(n) for a segment n to be delivered may be calculated in dependence on the target delivery time TD(n) and relative size Sr(n) of the segment n, and the delivery parameters DP(m) for a preceding segment m (that is, m<n). The preceding segment m may be the immediately preceding segment to segment n (i.e. m=n−1), though it need not be.

The delivery parameters DP(m) may comprise a parameter indicative of how closely the target delivery times of one or more segments were met. The delivery parameters DP(m) of a segment m may for example be indicative of the time difference between the actual delivery time of the segment m and the target delivery time TD(m) for that segment. The delivery parameter may therefore indicate the deviation of a segment's delivery time from its target time specified in the time schedule.

As another example, the one or more delivery parameters DP(m) for a segment m comprise the packet loss rate associated with delivering that segment (denoted PLR(m)). The delivery parameters may comprise both the parameter indicative of the difference between the target and actual delivery times of a segment m, and the packet loss rate for that segment, PLR(m).

The delivery parameters DP(m) associated with a previously delivered segment m may be used to set the transmission parameters TP(n) for a subsequent segment n in a number of ways.

Knowledge of the deviation from the time schedule for delivered segments is useful for selecting the encoded bit rate of the segment n to be delivered. For instance, if the delivery parameter DP(m) indicates that a previous segment m was delivered after its target delivery time (and so the delivery of the segments is therefore behind the time schedule), the next segment to be delivered may be selected at a lower encoded bit rate to try and bring the delivery of the segments back on schedule. Conversely, if the delivery parameter indicates that the previous segment was delivered in advance of its target delivery time (and so the delivery of the segments is ahead of the timing schedule), the next segment to be delivered may be selected at a higher encoded bit rate because there was more time than anticipated according to the time schedule to deliver the segment.

As another example, the packet loss rate PLR(m) may be used to set the size of the congestion window for delivering a subsequent segment n. For example, the congestion window size for segment n may be set in dependence on the packet loss rate for segment m in accordance with a TCP protocol in order to be fair to competing traffic over the network 106. In some cases, the congestion window size for segment n may be set based on PLR(m) not to be fair to competing traffic, but to deliver the segment n by its target delivery time TD(n). This is because the packet loss rate experienced during the delivery of a previous segment may be used to infer whether that segment was delivered ahead or after its target delivery time TD(m). Specifically, a relatively high packet loss rate PLR(m) may indicate that the segment m was delivered after its target delivery time, whilst a relatively low packet loss rate PLR(m) may indicate that the segment was delivered ahead of its target delivery time.

In a further example, both the congestion window size and the encoded bit rate for the segment n may be set in dependence on the packet loss rate PLR(m). The congestion window size may be selected based on the value of PLR(m) to be fair to competing traffic flows over the network (e.g. in accordance with a TCP protocol). An encoded bit rate for the segment may then be selected based on the congestion window size so that the segment n is delivered before its target delivery time TD(n).

In other examples, both the encoded bit rate and the congestion window size are determined in dependence on the deviation from a target delivery time for a previous segment m, and the packet loss rate PLR(m).

As mentioned above, the delivery parameters DP(m) may be calculated either at the server 104 or the client 108.

The delivery parameter unit 220 of the server 104 may determine the time difference between the actual delivery time of a segment m and its target delivery time TD(m) using information communicated from the client to which that segment was delivered. For example, the client that receives segment m may communicate back to the server 104 an indication of the time delivery of that segment was completed. That indication may be received at the server at its output interface 212 and communicated to the delivery parameter unit 220. The delivery parameter unit 220 receives the target delivery time TD(m) for the segment m from the scheduling unit 214. From this information the delivery parameter unit 220 can calculate the deviation from the time schedule for the previous segment m.

The packet loss rate PLR(m) may be calculated by the server 104 (either by unit 220 or a dedicated packet loss calculator) from information contained in acknowledgement messages received at the interface 212. The client to which the segments are delivered may communicate back to the server 104 an acknowledgement message for each packet received. Each acknowledgement message contains a sequence number indicative of the amount of contiguous data (e.g. the number of consecutive packets) received from a specified time. Following a packet loss, the client continues to send acknowledgement messages, but with identical sequence numbers. Thus, an inspection of the sequence numbers of the acknowledgement messages received at the interface 212 can be used to detect a packet loss event, and hence a packet loss rate. Alternatively, the packet loss rate PLR(m) may be calculated at the client 108 and communicated back to the server 104.

The delivery parameters DP(m) as determined by the delivery parameter unit 220 are then communicated to the transmission parameter unit 218, which sets the transmission parameters DP(n) in the manner of the examples described above.

The delivery parameter unit 316 of the client 108 may determine the time difference between the actual delivery time of a segment m and its target delivery time TD(m) using information in its data store 306. The data store 306 may for example store the time the delivery of the segment m was completed. The delivery parameter unit 316 may then receive the target delivery time TD(m) for the segment from the scheduling unit 310.

The client 108 may calculate the packet loss rate PLR(m) (either at the delivery parameter unit 316 or a dedicated packet loss calculator) from information contained in the packets received at the interface 302. For example, the client 108 may detect that a packet loss has occurred from an inspection of sequence numbers associated with each received data packet, e.g. if it detects a gap in the sequence numbers of received packets. The sequence numbers of the received data packets may be stored within client 108, for example in the data store 306.

The delivery parameters DP(m) as determined by the delivery parameter unit 316 are then communicated to the transmission parameter unit 314, which sets the transmission parameters DP(n) in the manner of the examples described above.

An illustration of how transmission parameters TP(n) may be set for an example sequence of segments being delivered will now be described with reference to FIG. 9.

Figure 8:
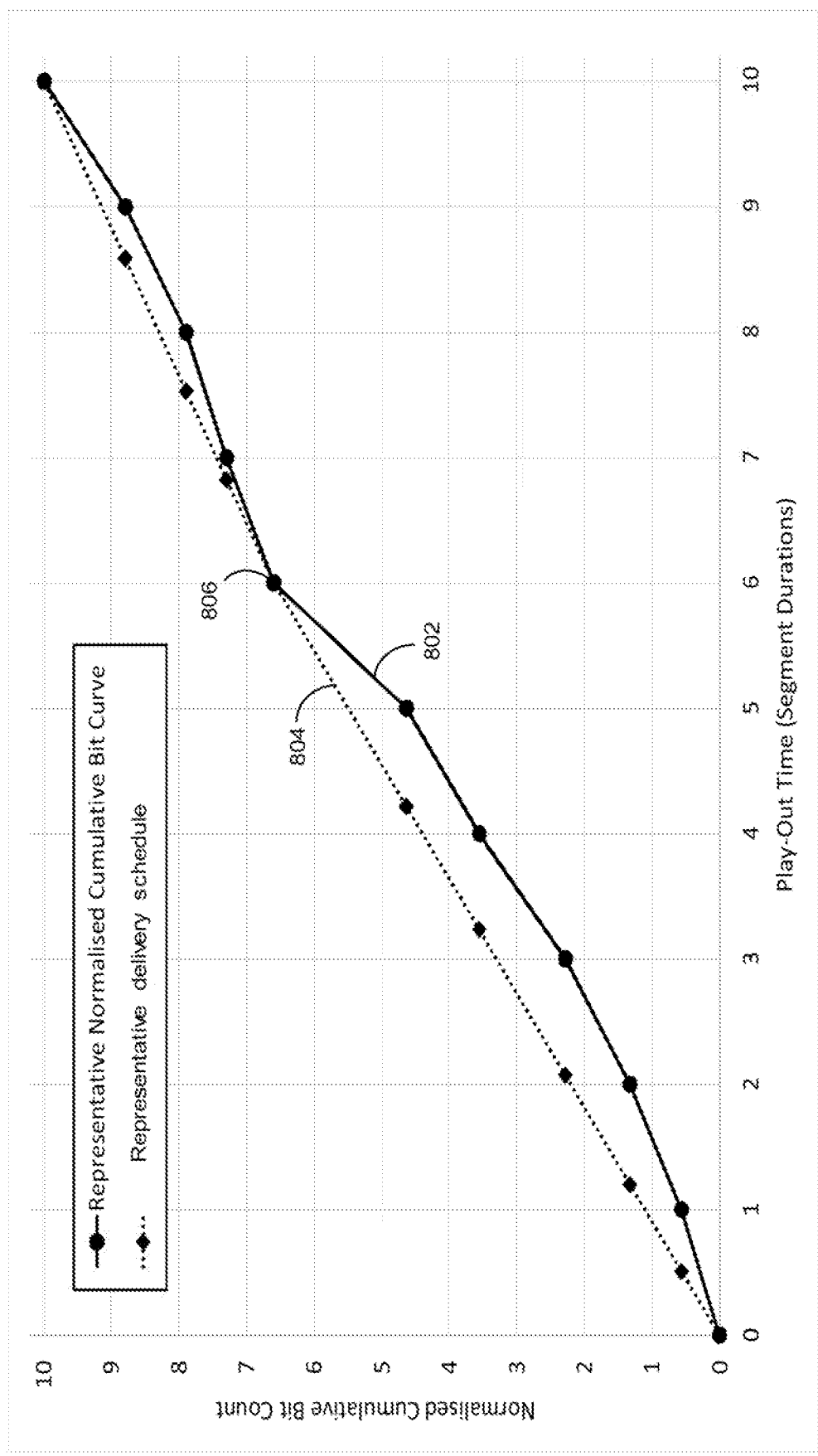
FIG. 8 shows a representative decoding and delivery schedule for the content encoded at three different quality levels generated from the schedules shown in FIG. 7.
Figure 9:
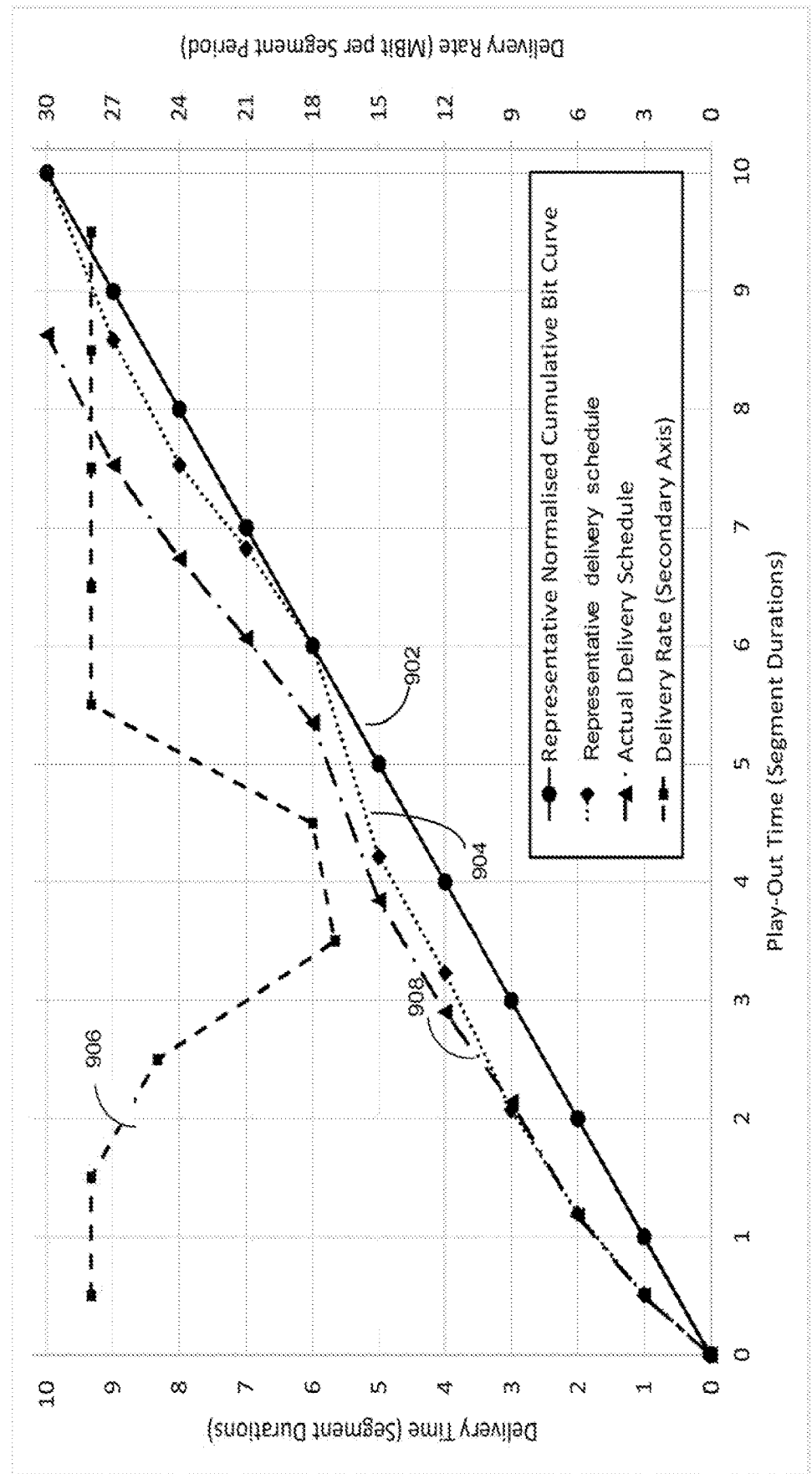
FIG. 9 shows the deviation of an actual delivery schedule from the representative delivery schedule shown during delivery of segments at a variable delivery rate.

FIG. 9 shows the decoding schedule 802 and delivery schedule 804 of FIG. 8 but with the left-hand y-axis now representing delivery time in segment periods, rather than a normalized cumulative bit count. The schedules 802 and 804 plotted with respect to time in segment periods are denoted 902 (decoding schedule) and 904 (delivery schedule) respectively. In this representation, the decoding schedule 902 is a straight line with unity slope. Also shown in FIG. 9 is an example delivery rate 906 for each of the segments delivered. The values of the delivery rates are shown in the right-hand side y-axis. The line 908 represents the actual delivery schedule of the segments as they are delivered. The horizontal distance between corresponding points of the target delivery schedule 904 and the actual delivery schedule 908 represents the difference between the delivery time of a segment and its target delivery time (in terms of segment playout durations).

The first segment has a target delivery time TD(1) of 0.51 segment periods (as determined from the delivery schedule 904). The server 104 selects the highest quality encoding of the first segment and a congestion window size to ensure timely delivery (i.e. delivery before the target delivery time TD(1)=0.51 segment periods). The segment is delivered in 0.50 segment periods, i.e. ahead of its target time. This may be because the server over-estimated the congestion window size needed to ensure timely delivery, or network throughput conditions were better than anticipated.

The client then issues a request for the second segment, which has a target delivery deadline TD(2) of 1.20 segment periods, measured from the start time. This allows 0.70 segment periods for delivery of this segment, slightly more than specified in the time schedule calculated from the delivery schedule 904 (which specifies 0.69 segment periods for the delivery of the second segment). In this example, as the change is little, the server may continue with the same congestion window size, and delivery completes after 1.18 segment periods (i.e., ahead of the target delivery time TD(2)).

A request is then issued for segment three, which has a target delivery time TD(3) of 2.07 segment periods. However, the delivery of the third packet suffers from a high packet loss rate PLR(3), as indicated by the decrease in the delivery rate 906. This causes the third segment to be delivered at a time of 2.14 segment periods, which is 0.07 segment periods after its target delivery time TD(3).

A request is next issued for the fourth segment, which has a target delivery time TD(4) of 3.24 segment periods. In response to the packet loss rate PLR(3) suffered by the third segment, the congestion window size is reduced for the delivery of the fourth segment, and the lowest encoded bit rate for the segment is selected given the selected congestion window size. These changes to the transmission parameters TP(4) for the fourth segment cause the segment to be delivered at a time of 2.90 segment periods, i.e. ahead of its target delivery time TD(4).

Because the fourth segment was delivered ahead of schedule, more time is allocated for the delivery of the fifth segment compared to what is specified in the time schedule derived from the delivery schedule 904. This enables a middle encoded bit rate to be selected for the fifth segment. During delivery of the fifth segment, the packet loss rate decreases (corresponding to an increase in the delivery rate 906), allowing the remaining segments 6 to 10 to be delivered at the highest encoded bit rate.

The above example illustrates how transmission parameters TP(n) for a segment n to be delivered can be set in dependence on the target delivery time TD(n) of the segment and on delivery parameters DP(m) of previous segments.

In the examples described so far, the time schedule that specifies the target delivery time TD(n) for each segment is constant throughout the delivery of the segments. However, in some examples the time schedule may be revised, or updated, during the delivery of the segments to revise the target delivery times for segments yet to be delivered over the network. The updating of the time schedule may be performed by the scheduling units 214 or 310.

The time schedule may be updated in response to a segment being delivered at a time after its target delivery time. For example, referring back to FIG. 9, the target delivery times for segments following segment three may be revised because segment three was delivered after its target delivery time TD(3). It may be advantageous to revise the time schedule in this manner to smooth out the response of the system to a missed target delivery time. If the target delivery times are not revised following a missed target time, the system may respond by attempting to make up all the time lost relative to the time schedule in the delivery of the next segment, where the time lost is the amount by which the previous segment missed its target delivery time. This in turn may cause a pronounced change in the transmission parameters for the next segment, such a large reduction in the selected encoded bit rate, or a large reduction in congestion window size. It has been appreciated that in certain cases it may be better to 'spread' the recovery of the lost time over the delivery of more than one segment. However, the recovery of the lost time should be recovered by the time of the next critical point (which in the example shown in FIG. 9 is segment six). Thus, the target delivery times of the segments corresponding to critical points remain unchanged.

The scheduling units may calculate the revised target delivery times by performing a linear interpolation from the actual delivery time of the most recently delivered segment m to the target delivery time of the next critical point. In particular, the revised target delivery time, RTD(n), for a segment n to be delivered may be calculated as:

$$RTD(n) = ATD(m) + (TD(n) - TD(m)) \times \frac{TD_{CP} - ATD(m)}{TD_{CP} - TD(m)} \quad (2[[1]])$$

In equation (2), ATD(m) is the actual delivery time for a segment m delivered after its target delivery time TD(m), TD(n) is the previous target delivery time for segment n, and $TD_{CP}$ is the target delivery time of the next critical segment (i.e. the time of the next critical point).

The scheduling units may calculate a revised target delivery time for each segment n yet to be delivered in accordance with equation (2).

Figure 10:
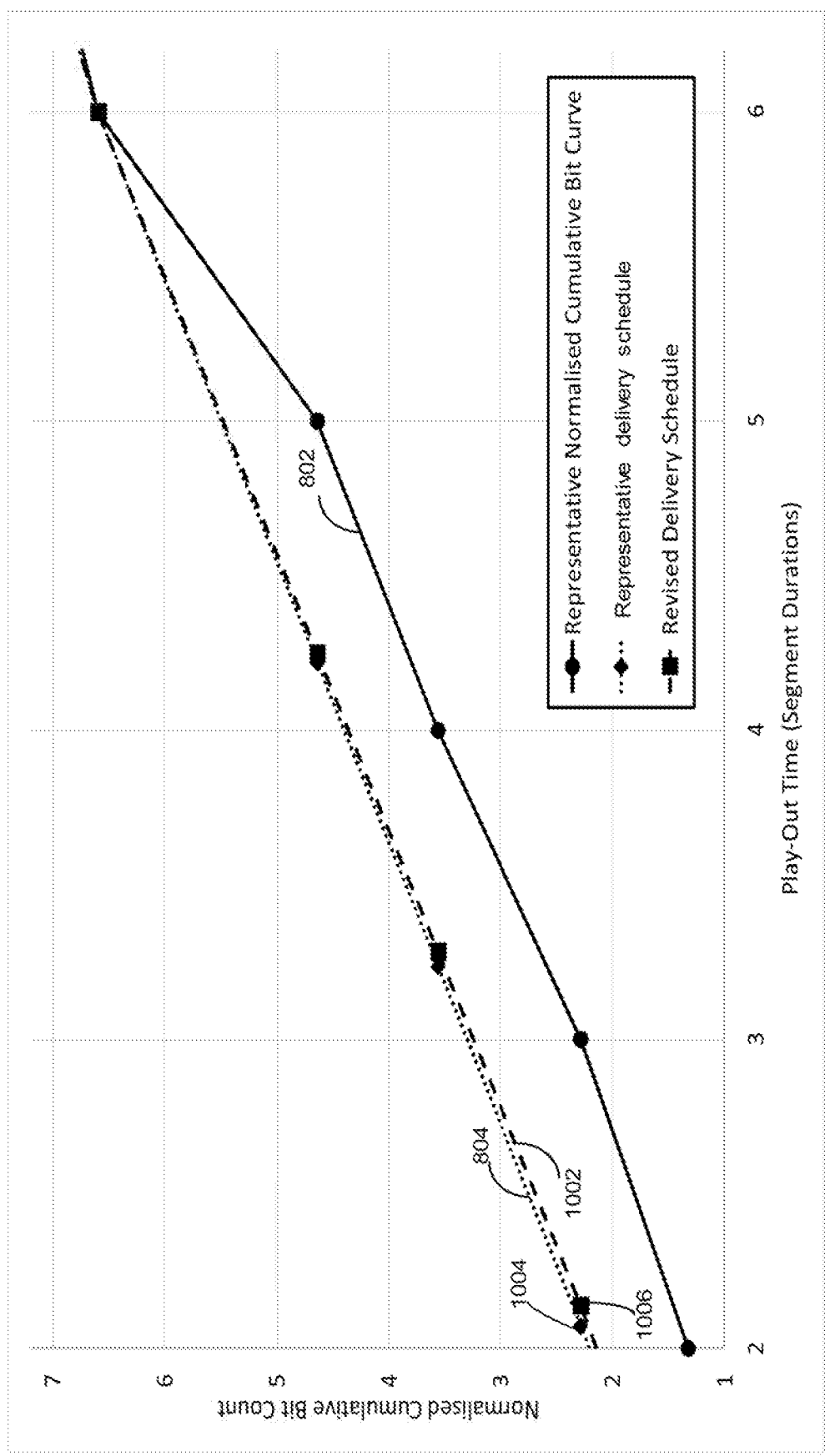
FIG. 10 shows how a revised delivery schedule is generated from interpolation.

A graphical illustration of how the linear interpolation may be performed is shown in FIG. 10, which like FIG. 8 shows the normalized cumulative bit count plotted against segment play-out time. The initial target delivery time for the third segment TD(3) according to the delivery schedule 804 is shown at 1004, and the actual delivery time for that segment ATD(3) is shown at 1006. A revised delivery schedule formed from a linear interpolation between ATD(3) and the next critical point is shown at 1002. The revised target delivery times for each segment can be calculated graphically from the revised delivery schedule 1002 in a similar manner to that described above with reference to FIG. 8.

A revised time schedule may alternatively be calculated after the delivery of each segment (regardless of whether that segment was delivered after its target delivery time). For example, a revised target delivery time RTD(n) for a segment n may be calculated based on the temporal play-out duration of buffered content at the client (i.e. the play-out duration of the content received at the client from the server but not yet played-out). The amount of buffered content may be compared to a target amount of buffered content determined from the delivery and decoding schedules. If the amount of buffered content indicates that delivery of the segments is ahead of the delivery schedule, a revised delivery schedule may be calculated using only the critical points. Due to the knowledge of the amount of content in the buffer, this approach may be implemented in the scheduling unit 310 of the client 108.

The above examples describe approaches for setting the transmission parameters of segments to be delivered over a network in accordance with a time schedule expressed only in the time domain. The approaches described herein enable the scheduling of content encoded using a constant quality encoding scheme and delivered using adaptive bit rate delivery to be simplified, enabling content to be delivered with a more consistent perceived quality.

The examples above have been described with reference to an example transmitter (in the form of a server 104) and example receiver (in the form of a client 108) that are both capable of performing the full functionality of the techniques described herein. However, it will be appreciated that the functionality required to implement the techniques described herein may be distributed between the server and client in other ways.

For example, the server 104 may comprise a parameter calculation unit 216 as above, but may receive a time schedule indicating the target delivery times of the segments, rather than calculating this internally at scheduling unit 214. For example, the target delivery times may be computed at the client and communicated to the server (e.g. as part of a content request). The server 104 may therefore not include scheduling unit 214 or the dataset generation unit 224. As another example, the server may include scheduling unit 214 for computing the time schedule, but not the dataset generation unit 224. Instead, the server may receive a representative set of normalized segment sizes that can be used by the scheduling unit 214 to calculate the time schedule. The server may receive this information from the content generator, for example.

Likewise, the client 108 may comprise parameter calculation unit 312 as above, but may receive the time schedule indicating the target delivery times of the segments, rather than calculating these internally at the scheduling unit 310. For example, the target delivery times may be computed at the server and communicated to the client 108. The client may therefore not include scheduling unit 310 or dataset generation unit 318. As another example, the client may include scheduling unit 310 for computing the time schedule, but not the dataset generation unit 318. Instead, information on the normalized sizes of each segment that are used by the scheduling unit 310 may be received at the client 108, e.g. from the server.

The above examples have been described with reference to a server and a client. The server could for example be a content server configured to transmit data packets using variable bit rate delivery in accordance with a suitable protocol, such as an HTTP Adaptive Bit Rate Protocol (e.g. HTTP DASH; HTTP Live Streaming (HLS) etc.). The server could for example be a Content Delivery Network (CDN) node, and the network 106 a Content Delivery Network. Alternatively, the server could be a web server or a mail server. The client could be a device such as a computer; laptop, PC; mobile phone; smartphone; tablet; set-top box; smart TV; smart watch, etc. Alternatively, the client could be some other type of device, such as a wireless access point or a router. More generally, the server described herein is an example of a transmitter for transmitting content segments over a network, and the client is an example of a receiver for receiving segments over a network.

Generally, any of the functions, methods, techniques or components described above for the components of the communication system can be implemented in software, firmware, hardware (e.g., fixed logic circuitry), or any combination thereof. The terms "unit", "detector" and "calculator" as used herein may generally represent software, firmware, hardware, or any combination thereof. In the case of a software implementation, the unit, detector and calculator represent computer program code or computer readable instructions that perform the specified tasks when executed on a processor. The algorithms and methods described herein could be performed by one or more processors executing code that causes the processor(s) to perform the algorithms/methods. The computer program code may be stored on a non-transitory computer-readable storage medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of delivering a video sequence in a network, the video sequence comprising a plurality of temporal segments each encoded at a plurality of qualities, the method comprising:

prior to delivery of any of the plurality of temporal segments: computing a dataset indicating a relative size of the plurality of temporal segments of the video sequence;

computing a representative decoding schedule for the plurality of temporal segments of the video sequence as a cumulative function of the relative size of plurality of temporal segments of the video sequence;

computing in dependence on the representative decoding schedule a representative delivery schedule for delivery of the plurality of temporal segments of the video sequence, the representative delivery schedule indicating a target delivery time for each temporal segment of the video sequence, each target delivery time being no later than a decoding time of the temporal segment indicated by the representative decoding schedule, and each target delivery time being independent of the encoded quality of each temporal segment;

then, for each temporal segment, delivering the respective temporal segment by:

setting one or more transmission parameters for the temporal segment in dependence on the target delivery time for the temporal segment and the relative size of the temporal segment; and delivering the temporal segment over the network using the one or more transmission parameters; and wherein the representative delivery schedule is a piecewise linear curve with a monotonically decreasing slope.

2. The method as claimed in claim 1, wherein the one or more transmission parameters comprise a quality at which the temporal segment is encoded.

3. The method as claimed in 1, wherein the one or more transmission parameters comprises a congestion window size for transmitting the temporal segment.

4. The method as claimed in claim 1, wherein the method further comprises, for each temporal segment subsequent to a first temporal segment of the plurality of temporal segments: determining one or more delivery parameters associated with delivery of a previously delivered temporal segment; and setting the one or more transmission parameters further in dependence on the delivery parameter for the previously delivered temporal segment.

5. The method as claimed in claim 4, wherein the one or more delivery parameters comprises a parameter indicative of a difference between a delivery time of the previously delivered temporal segment and the target delivery time of the previously delivered temporal segment.

6. The method as claimed in claim 4, wherein the one or more delivery parameters comprises a packet loss rate associated with the delivery of the previously delivered temporal segment.

7. The method as claimed in claim 1, wherein the dataset is a representative set of relative segment sizes for the plurality of qualities that indicates a representative relative size for each temporal segment.

8. The method as claimed in claim 7, wherein the method further comprises: generating, from a plurality of sets of relative segment sizes each indicating the relative size of the temporal segments at a respective quality, the representative set of relative segment sizes for the plurality of qualities; and storing the representative set as the dataset.

9. The method as claimed in claim 8, wherein the representative set is generated from a mathematical average of the sets of relative segment sizes for the plurality of qualities.

10. The method as claimed in claim 7, wherein the size of each temporal segment in the representative set is selected from one of the sets of relative segment sizes indicating the relative size of the temporal segments at a respective quality.

11. The method as claimed in claim 1, wherein the method further comprises updating the time schedule during delivery of the temporal segments to revise the target delivery times for temporal segments yet to be delivered over the network.

12. The method as claimed in claim 10, wherein the time schedule is updated in response to a segment being delivered at a time after the target delivery time.

13. The method as claimed in claim 11, wherein the time schedule is updated using a linear interpolation from the delivery time of a most recently delivered temporal segment to the target delivery time of a critical segment next occurring in the video sequence, wherein the critical segment is such that transmission rates for temporal segments subsequent to the critical segment calculated from the initial time schedule are less than calculated transmission rates for temporal segments prior to the critical segment.

14. The method as claimed in claim 12, wherein the time schedule is updated so that the revised target delivery time for a segment n to be delivered, RTD(n), is calculated as "TDep-ATD (m) RTD(n)=ATD(m)+(TD(n)−TD(m))× TDee_TbUm)" where A7D/(m) is an actual time of delivery for a segment m delivered after its target delivery time TD(m), TD(n) is a prior target delivery time for the segment n, and 7Dcp is a delivery time of the next critical segment in the video sequence.

15. A data transmitter configured to deliver a video sequence comprising a plurality of temporal segments encoded at a plurality of qualities over a network, the data transmitter comprising:

a parameter calculation unit configured to, prior to delivery of any of the plurality of temporal segments:

compute a representative decoding schedule for the plurality of temporal segments of the video sequence from a dataset indicating the relative size of the plurality of temporal segments of the video sequence, the representative decoding schedule being a cumulative function of the relative size of temporal segments of the video sequence, compute in dependence on the representative decoding schedule a representative delivery schedule for delivery of the plurality of temporal segments of the video sequence, the representative delivery schedule indicating a target delivery time for each temporal segment of the video sequence, each target delivery time being no later than a decoding time of the temporal segment indicated by the representative decoding schedule and each target delivery time being independent of the encoded quality of each temporal segment, for each temporal segment, set one or more transmission parameters for the temporal segment in dependence on the calculated target delivery time for the temporal segment and the relative size of the temporal segment; and a dispatch unit configured to deliver each temporal segment over the network using the one or more transmission parameters for that temporal segment; and wherein the representative delivery schedule is a piecewise linear curve with a monotonically decreasing slope.

* * * * *